July 27, 1937.  K. RABE  2,088,341
SPRINGING ARRANGEMENT FOR MOTOR CARS AND THE LIKE Original Filed July 26, 1934

Inventor:
Karl Rabe
By
Attorney

Patented July 27, 1937

2,088,341

UNITED STATES PATENT OFFICE 2,088,341

SPRINGING ARRANGEMENT FOR MOTOR CARS AND THE LIKE

Karl Rabe, Stuttgart, Germany

Original application July 26, 1934, Serial No. 737,099. Divided and this application July 26, 1935, Serial No. 33,391. In Germany July 13, 1933

15 Claims. (Cl. 267—21)

This application is a division of application Serial No. 737,099, filed July 26, 1934.

This invention relates to springing arrangements for motor cars and the like.

It is an object of the present invention to provide such springing arrangements in which unitary spring units are used which may readily be renewed and replaced by new units.

Other objects are to provide simple and convenient means for adjusting the springing mechanism, and to generally improve springing arrangements for vehicles.

Springing arrangements are already known, in which the link member or shafts which are journalled in the frame are engaged by steel bars which are torsionally stressed. For insuring the requisite specific wheel springing, these spring bars must be made exceedingly thin. This makes it difficult to find room for the requisite length of bar in the frame. More particularly in the case of spring bars which are disposed transversely in the frame, it is as a rule impossible to adapt the requisite length of bar to the available width of frame. In this case it becomes necessary to increase the length of the link member, which results in an undue increase in the unsprung masses. A further disadvantage of this manner of springing is that it is completely undamped, as steel has no self damping property. In order to give this springing the properties required in practical operation, special shock absorbers must be provided, the mounting of which is very inconvenient and costly. The object of the invention is to overcome these disadvantages.

The invention contemplates that the journals or shafts of the link members, which are journalled in the frame, engage rubber bars which are stressed in a torsional or shearing sense. Such rubber bars are stouter, that is to say, they have a smaller length as compared with the steel bars. On the other hand, however, they have a greater diameter and therefore adapt themselves more readily to the given space conditions. For this reason it is possible to house the rubber bars within the frame, even in the case of high specific wheel springing motions, so that there is complete freedom in designing the lengths of the link members. The vibration strength of the rubber bars is greater than that of the steel bars, without any danger of their settling when in operation. Furthermore, the weight of the rubber bars themselves is lower, but due to the particular way in which they are fixed a dead spring volume can be avoided. The breaking of a spring practically never occurs. As rubber has a high coefficient of damping, the additional provision of shock absorbers becomes unnecessary. The damping energy absorbed by the rubber bars can thus, owing to the great bar surface, be transmitted directly to the frame in the form of heat. The damping energy itself can be regulated in a suitable manner by simple means, for instance, by frictional contact between the free bar surface and the frame. The properties governing springs are in this case more favorable, as the power of the spring increases progressively with respect to the path of the spring. By an additional initial stressing of the rubber bar in tension or compression these properties can also be regulated in any desired manner.

Springing arrangements employing rubber bodies stressed in shear are already known. In these arrangements, however, the link members are not rigidly mounted in the frame but are embedded in the rubber bodies themselves. The link members are, therefore, not only sprung by these rubber bodies, but are also supported by them, so that the rubber bodies are stressed not only in shear but also in tension and compression. Through the mobility in all directions of the link member ends in the rubber bodies, it is as a rule impossible to obtain a guiding of the wheel with one possibility of motion with respect to the frame. Attempts have been made, it is true, to reduce this mobility in all directions by mounting the rubber bodies in the frame with a considerable initial stressing in compression. This, however, reduces the absorbing capacity of the rubbed, with the result that greater spring volumes must be used for obtaining the high specific springing required for independent wheels. As, however, these rubber bodies have in the latter case to absorb the bearing forces as well as the returning forces, they are far more liable to fatigue and have, therefore, to be changed after being in operation only for a short time.

Several constructional examples of the arrangement according to the invention are shown in the accompanying drawing, in each case as applied to the wheel of a motor vehicle.

Figure 1:
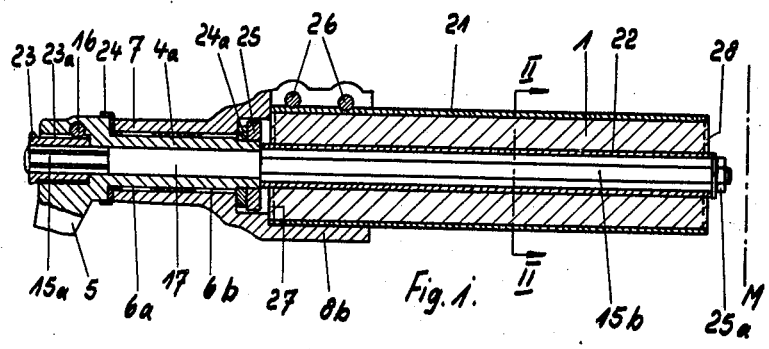
Figure 1 is a vertical main section through a constructional form.
Figure 2:
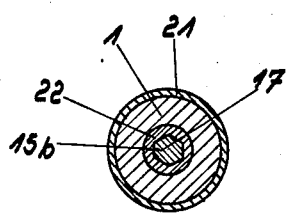
Fig. 2 is a section on line II—II of Fig. 1.

In the constructional example according to Figs. 1 and 2, concentric sleeves 21, 22 are vulcanized on to the cylindrical surfaces of the hollow cylindrical rubber bar 1, between which sleeves the rubber bar 1 rests without any initial stressing. The outer sleeve 21 is secured by clamping screws 26 in the suitably slotted casing flange 8b. The inner sleeve 22 is slipped on to a polygonal profile 15b of the link member shaft 17 and is preferably secured by a nut 25a. It will be noted that the polygonal interengaging parts comprise shoulders on the inside of the sleeve 22 interengaging with the shaft 17. The end surfaces 27, 28 of the rubber bar 1 are shut off in an oil-tight manner. The link member shaft 17 is journalled in the hollow link member journal 4a and is connected by means of a polygonal profile 15a at its outer end to an intermediate sleeve 23. The intermediate sleeve 23 is connected by a shouldered or other polygonal profile 23a to the link member 5 and is secured in the latter by a pin 16. The link member journal 4a is journalled in the casing 7 by suitable means such as needle bearings 6a, 6b and is secured against longitudinal displacement by means of the discs 24, 24a and a nut 25. The casing 7 is rigidly connected to the frame in any suitable manner.

On the wheel swinging, the torque is transmitted from the link member 5 through the intermediate sleeve 23 to the link member shaft 17, and from the latter through the sleeve 22 to the inner cylindrical surface of the rubber sleeve 1 which is thereby stressed in shear uniformly over its entire length. Through the turning of the inner sleeve 22 with respect to the outer sleeve 21, the material is initially stressed. The connection through adhesion has in this case the advantage that there can be no loosening of the connection in any circumstances and that the energy absorbing and conducting capacity of the material is far greater. The rubber bar 1 with the sleeves 21, 22 can be supplied as a complete unitary spring body which only requires sliding on to the link member shaft 17 and securing with respect to the latter and the frame, thus providing a readily replaceable spring unit. The spring tension can be regulated in a very simple way. When the wheel is not loaded, the pin 16 is first removed, thereupon the intermediate sleeve 23 is drawn outwards, and finally it is reinserted after being turned round in the polygonal or shouldered profile or spline 23a. The requisite fine adjustment may be very quickly effected by simultaneously turning the intermediate sleeve 22 into a different position both with respect to the corrugated profile 23a and the hexagon 15a, it being understood that the number of splines on the inside and outside of sleeve 23 are different.

Figure 3:
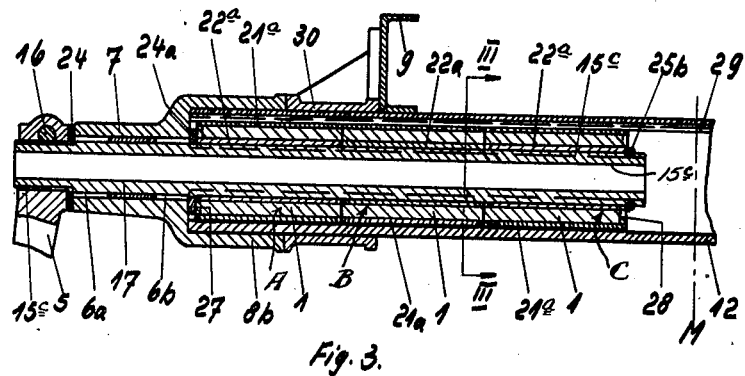
Fig. 3 is a vertical main section through a modified constructional form.
Figure 4:
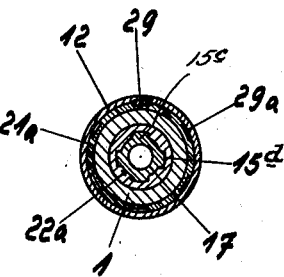
Fig. 4 is a section on line IV—IV of Fig. 3.

In the constructional example shown in Figs. 3 and 4, there are slipped on to the ribbed or shouldered profile 15d of the hollow link member shaft 15c (shown hollow or tubular) successively three similar spring bodies or units A, B, and C of the kind just described, secured in place as by a spring ring 25b. Only the exposed end surfaces 27, 28 of the two outer spring bodies are sealed in an oil-tight manner. The outer sleeves 21a of these spring bodies are journalled in the hollow transverse member 12 and are secured against turning by a flat key 29 which extends lengthwise thereof. The outer sleeves 21a are provided with grooves 29a on their exterior distributed star-fashion thus forming shoulders for cooperation with the flat key 29. The hollow transverse member 12 is fixed by means of the bracket 30 to the longitudinal frame member 9. The casing 7 is slipped on to the outer end of the hollow transverse member 12 by means of a flange 8b and is fixed to the socket 30. The link member shaft 17 is journalled in the casing 7 as by means of the needle bearing rollers 6a, 6b and is secured against longitudinal displacement by the discs 24, 24a. The link member 5 is connected to the outer end of the link member shaft 17 by a shouldered profile 15a and is secured by a pin 16.

This springing arrangement operates exactly in the same way as that in the previous example. As will be immediately apparent the adjacent spring bodies coact as a single rubber bar. The advantage is secured, however, that these relatively short spring bodies can be made far more accurately and economically. These spring bodies may, for instance, be made to standard dimensions and the required number of them may be placed next to one another, according to the magnitude of the desired specific springing effect, so that the parts built into the frame always remain unaltered. The oil-tight sealing of the exposed end surfaces protects the material from wetting liquids and in this way prevents its premature destruction. In this case, for regulating the spring tension the link member 5 may be varying the angular position of the arm 5 upon the link member shaft 17, a fine adjustment being obtained by simultaneously displacing the spring body in the ribbed profile 15d with respect to the link member shaft 17, or in the keyways 19a with respect to the hollow transverse member 12. The wheel may be removed with all the guiding springing and journalling parts, for which purpose it is only necessary to release the screws for fixing the casing flange 8b to the socket 30. Furthermore, the axle can be removed as a unit by releasing the screws for fixing the bracket 30 to the longitudinal members 9 of the frame.

The invention is, of course, not restricted to these constructional examples. The link member 5 may be mounted in any suitable manner in the casing 7, as long as the wheel remains guided with one direction of motion with respect to the frame. Whether the wheel is supported by a single link member or a pair of link members forming a parallel motion arrangement is immaterial as regards the nature of the invention. It is also immaterial whether the wheel swings in the direction of travel or at right-angles thereto. In place of rubber any other elastic material may be employed insofar as it is capable of being stressed and fixed in the same way as rubber. The rubber bar may also be totally enclosed in a separate casing, that is, independently of the frame members, for instance, may be enclosed directly in the casing 7.

The word "frame" as herein used is not to be understood as limited to such a device when formed separate from the body or coachwork of the vehicle, but as including such devices when formed integral with said body or coachwork.

I claim as my invention:

1. In a vehicle, a frame, a swinging half-axle, a road wheel thereon, means for supporting said swinging half-axle relative to said frame comprising a unitary replaceable spring mechanism comprising an inner metallic tubular member, an outer metallic tubular member, a tubular elastic member having a length greater than its outer diameter located between and fixedly attached throughout its length to said inner and outer members, a shaft connected against relative rotation to said inner member, and means interconnecting said shaft and said swinging half axle.

2. In a vehicle, a frame, a swinging half-axle, a road wheel thereon, means for supporting said swinging half-axle relative to said frame comprising a spring mechanism comprising an inner metallic member, an outer metallic tubular member and an integral tubular elastic member having a length greater than its outer diameter, located between and fixedly attached to said inner and outer members, means for connecting one of said members to the frame and the other to the swinging half-axle, one of said connecting means being rotarily adjustable.

3. A springing arrangement in accordance with claim 2 in which said rotary adjusting means comprises a multi-shouldered connection.

4. The combination according to claim 1 in which said tubular elastic member is made of rubber.

5. In a vehicle, a frame, a road wheel, means for supporting said road wheel relative to said frame comprising a plurality of unitary replaceable spring mechanisms arranged in end to end relationship, each of said spring mechanisms comprising an inner metallic member, an outer metallic tubular member, and a tubular rubber-like member located between and fixedly attached to said inner and outer members.

6. In a vehicle, a frame, a road wheel, means for supporting said road wheel relative to said frame comprising a hollow frame member, a unitary replaceable spring mechanism comprising an inner metallic member, an outer metallic member shouldered to interengage said hollow frame member, and a tubular rubber-like member having a length greater than its outer diameter located between and fixedly attached to said inner and outer members.

7. In a vehicle, a frame, a road wheel, means for supporting said road wheel relative to said frame comprising a unitary replaceable spring mechanism comprising an inner metallic member internally shouldered throughout its length to interengage with a member connected thereto, an outer metallic member, and a tubular rubber-like member having a length greater than its outer diameter located between and fixedly attached to said inner and outer members.

8. The combination according to claim 6 in which said inner member is formed as a sleeve the inner surface of which is shouldered to interengage with a connecting member passing therethrough.

9. A unitary replaceable spring unit for vehicles and the like comprising an inner metallic member formed as a sleeve the inner surface of which is shouldered to interengage with a connection member passing therethrough, an outer metallic tubular member shouldered to engage with a surrounding holding member, and a tubular rubber-like member having a length greater than its outer diameter located between and fixedly attached to said inner and outer members.

10. A unitary replaceable spring unit for vehicles and the like comprising an inner metallic member internally shouldered throughout its length to interengage with a member connected thereto, an outer metallic tubular member, and a tubular rubber-like member having a length greater than its outer diameter located between and fixedly attached to said inner and outer members.

11. The combination according to claim 2 in which said tubular elastic member is made of rubber.

12. In a vehicle, a frame, a road wheel, means for supporting said road wheel relative to said frame comprising a spring mechanism comprising an inner metallic member, an outer metallic tubular member, and a tubular rubber-like member located between and fixedly attached to said inner and outer members, means for connecting one of said members to the frame and the other to the road wheel supporting means, one of said connecting means including a rotary adjusting means comprising an intermediate member connected adjustably to said spring mechanism and also connected adjustably to said wheel supporting means.

13. In a vehicle, a frame, a road wheel, means for supporting said road wheel relative to said frame comprising a spring mechanism comprising an inner metallic member, an outer metallic tubular member, and a tubular rubber-like member located between and fixedly attached to said inner and outer members, means for connecting one of said members to the frame and the other to the road wheel supporting means, one of said connecting means comprising rotary adjusting means comprising an intermediate sleeve member formed with internal and external shoulders for adjustably connecting said sleeve to said spring mechanism and for adjustably connecting said sleeve to said wheel supporting means.

14. A springing arrangement for vehicles having a frame, in combination, a wheel and supporting means therefor, rotatable means journaled to said frame and fixedly attached to said wheel supporting means, and a unitary spring mechanism comprising an inner metallic member, an outer metallic member, and a tubular elastic member located between and fixedly attached to said inner and outer members, said inner metallic member having means for slidably interengaging said rotatable means but preventing relative rotation between these parts, and means for fastening said outer member to said frame.

15. The combination according to claim 14 in which said tubular elastic member is made of rubber.

KARL RABE.